United States Patent [19]  [11] Patent Number: 4,562,476
Shikano et al.  [45] Date of Patent: Dec. 31, 1985

[54] AUTOMATIC DIAPHRAGM CONTROL DEVICE FOR USE IWT CCTV CAMERA

[75] Inventors: Tohru Shikano; Terumi Ogasawara; Masayuki Arai, all of Tokyo, Japan

[73] Assignee: Asahi Seimitsu Kabushiki Kaisha, Tokyo, Japan

[21] Appl. No.: 651,078

[22] Filed: Sep. 17, 1984

[30] Foreign Application Priority Data

Sep. 19, 1983 [JP] Japan .................................. 58-172752

[51] Int. Cl.$^4$ ................................................ H04N 5/34
[52] U.S. Cl. ................................. 358/228; 352/141; 354/412
[58] Field of Search .............. 358/228, 213, 209, 906; 354/412, 423, 429, 442, 443; 352/141

[56] References Cited

U.S. PATENT DOCUMENTS

| | | | |
|---|---|---|---|
| 4,116,552 | 9/1978 | Wagensonner | 352/141 |
| 4,118,714 | 10/1978 | Okajima et al. | 354/31 |
| 4,174,526 | 11/1979 | Geurts | 358/219 |
| 4,192,588 | 3/1980 | Wagensonner | 354/43 |
| 4,200,372 | 4/1980 | Iwama et al. | 354/43 |
| 4,208,110 | 6/1980 | Ito et al. | 354/31 |
| 4,288,150 | 9/1981 | Ishida | 354/230 |
| 4,300,167 | 11/1981 | Miller et al. | 358/210 |
| 4,324,464 | 4/1982 | Wick | 354/25 |
| 4,331,401 | 5/1982 | Numata | 354/37 |
| 4,399,466 | 8/1983 | Stephenson | 358/228 |
| 4,408,852 | 10/1983 | Yamasaki | 354/24 |
| 4,437,744 | 3/1984 | Terui et al. | 354/442 |
| 4,458,811 | 6/1984 | Yamasaki | 354/412 |

Primary Examiner—Thomas W. Brown
Assistant Examiner—Robert G. Lev
Attorney, Agent, or Firm—Birch, Stewart, Kolasch & Birch

[57] ABSTRACT

The present invention relates to an automatic diaphragm control device for use with a CCTV camera in which a video signal applied from the CCTV camera is utilized for diaphragm control, and provides an automatic diaphragm control device for use with the CCTV camera, comprising first means for continuous control of the video signal with respect to an absolute brightness of an object to be picked up, second means for continuous control of a proportion of the video signal corresponding to a bright portion in the whole picture when a ratio of the bright portion to a dark portion of this object is relatively high, and third means for stabilization of a control signal, which has been obtained by said first and second means and then rectified, with respect to a source voltage.

5 Claims, 8 Drawing Figures

ID-USE IWT CCTV CAMERA

AUTOMATIC DIAPHRAGM CONTROL DEVICE FOR USE IWT CCTV CAMERA

BACKGROUND OF THE INVENTION

The present invention relates to an automatic diaphragm control device of the objective used in a CCTV camera which has recently found many applications.

Diaphragm control of a television camera objective utilizing a video signal coming from the television camera can be achieved sometimes with a control signal derived from said video signal which has directly been rectified, but this is not always possible, since a difference in the absolute brightness of an object to be picked up would be reflectd by a difference in the corresponding video signal level and such video signal level depends also upon the type of camera. In this situation, the optimum picture will be obtained only when the video signal coming from the television camera is appropriately controlled to form a desired diaphragm control signal. The ratio between the bright portion and the dark portion or the contrast value of the object reaches, in the natural world, for example, a level as high as tens : one even under the cloudy sky and often reaches hundreds : one under the blue sky. In the television-reproduced picture, on the contrary, the contrast value is limited to an order of 30 through 40:1. Accordingly, to obtain the optimum picture in the natural world, a proportion of the video signal corresponding to the bright portion in the whole picture must be appropriately controlled to produce a desired diaphragm control signal. Moreover, in view of a fact that various types of CCTV camera have recently been adopted in various fields for many purposes, the diaphragm control of the objectives incorporated in these cameras can not be achieved with high stability unless said diaphragm control signal can be obtained with a wide range of source voltages with high stability.

SUMMARY OF THE INVENTION

To resolve these problems, the present invention provides an automatic diaphragm control device for use with a CCTV camera, in which a video signal coming from a television camera is utilized for the diaphragm control, comprising first means for continuous control of the video signal with respect to an absolute brightness of an object to be picked up, second means for continuous control of a proportion of the video signal corresponding to a bright portion in the whole picture when a ratio of the bright portion to a dark portion of this object is relatively high, and third means for stabilization of a control signal, which has been obtained by said first and second means and then rectified, with respect to a source voltage.

Further other objects, features and advantages of the present invention will be apparent from a following description in detail and the accompanying drawings.

DESCRIPTION OF THE EMBODIMENT

The present invention will be now described in reference with the accompanying drawing in which an embodiment is illustrated.

Figure 1:
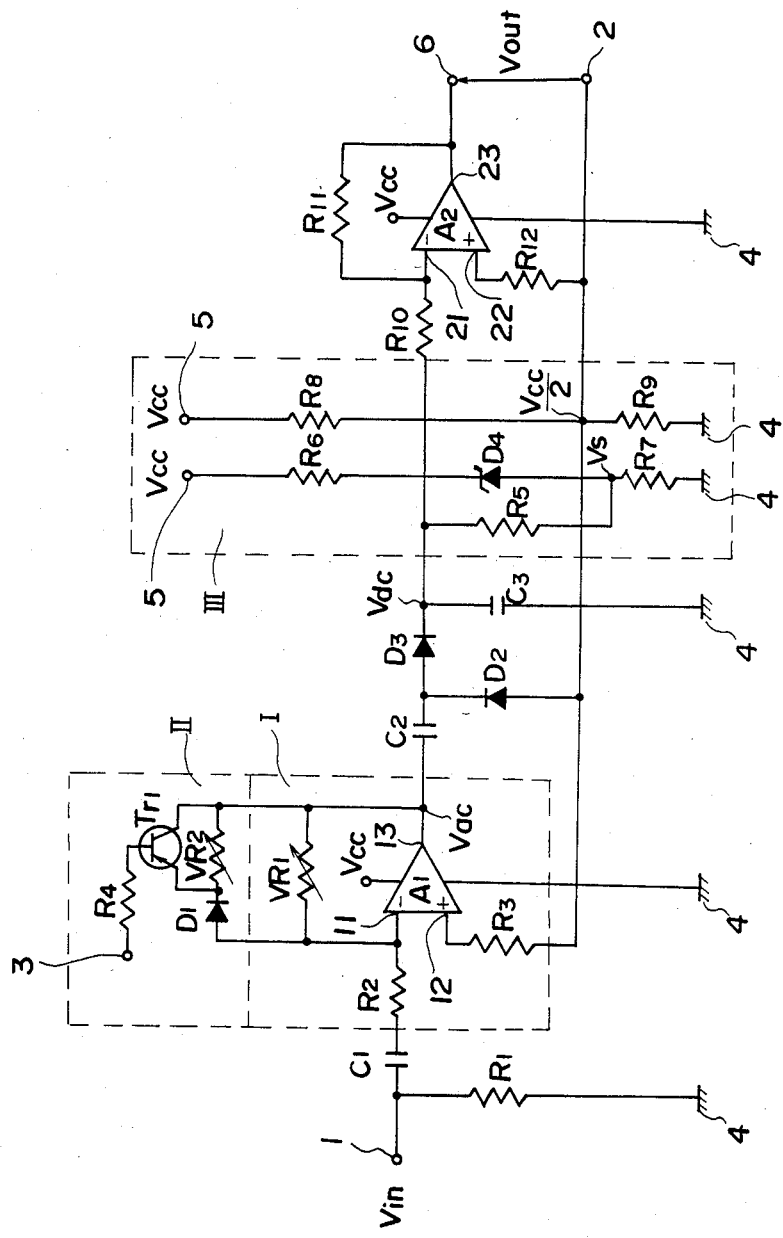
FIG. 1 is a circuit diagram illustrating an embodiment of the device constructed in accordance with the present invention.
Figure 2:
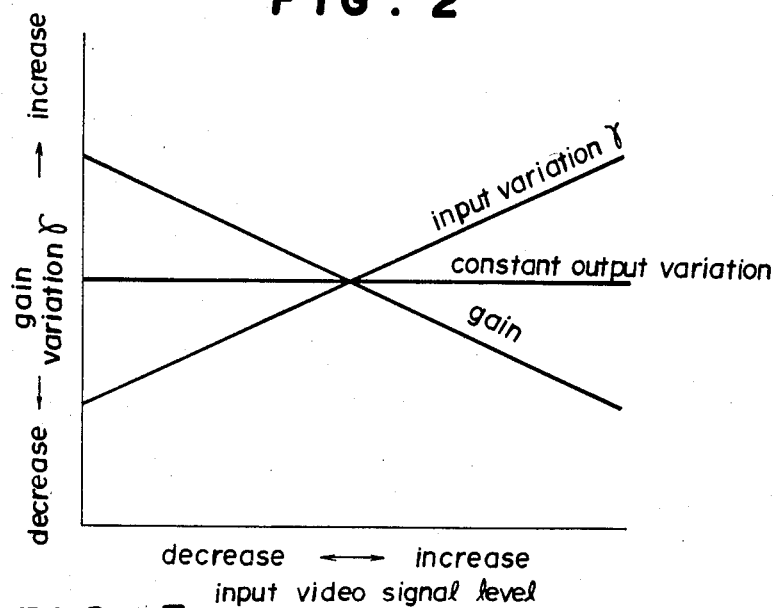
FIG. 2 illustrates a function of the first means provided in said circuit for continuous control of the video signal with respect to the absolute brightness of an object to be picked up.

Referring to FIG. 1, reference numeral 1 designates an input terminal adapted to be applied with a video signal Vin from a television camera. This input terminal 1 is connected, on one side, via a resistance R1 to a ground side 4 and, on the other side, via a capacitor C1 to an inverting amplifier I as first means of the present invention. In the inverting amplifier I, inverting input terminal 11 of an operational amplifier A1 is connected via said a resistance R2 to said capacitor C1, a non-inverting input terminal 12 is connected via a resistance R3 to a middle point voltage terminal 2 which will be described later, and there is provided between said inverting input terminal 11 and an output terminal 13 a variable resistance VR1 as a feedback resistance. This inverting amplifier I is so arranged that the video signal Vin having its DC component clipped in said capacitor C1 is inversely amplified by this amplifier I to produce an inversely amplified signal Vac on the output terminal 13 and its function as the first means of the present invention lies in that said variable resistance VRI is adjusted for continuous regulation of a gain (amplification degree) of the operational amplifier A1. More specifically, this first means is arranged on the basis of a fact that the amplification degree increases as the resistance value of the variable resistance VR1 becomes higher and the amplification degree decreases as said resistance value becomes lower. Referring to FIG. 2, in response to, for example, the video signal corresponding to the optimum picture, and, therefore, the input video signal Vin coming from the camera being relatively high, the input variation γ increases. In such a situation, the inverting amplifier I as the first means of the present invention is adapted to obtain the inversely amplified signal Vac with a constant output variation by reducing the resistance value to obtain an appropriately reduced gain or amplification degree. When the input variation γ of the video signal Vin is too small, on the contrary, the resistance value may be increased to obtain an appropriately increased gain or amplication degree, also assuring the inversely amplified signal Vac to be obtained with a constant output variation.

Figure 3:
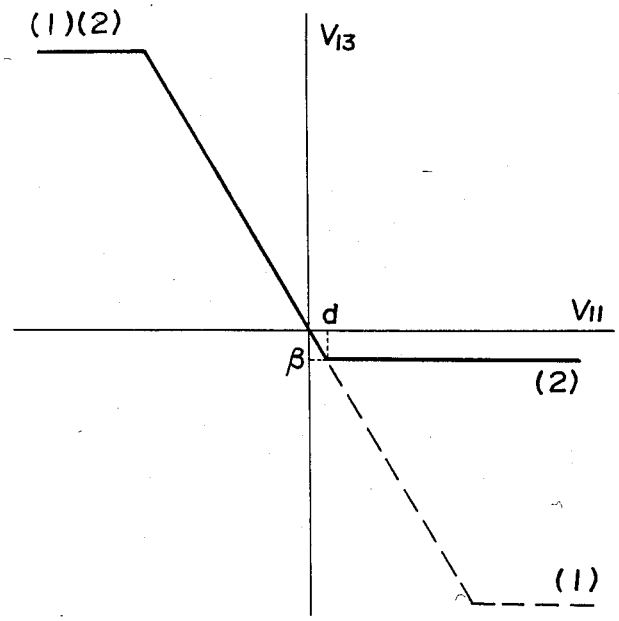
FIG. 3 illustrates a function of the second means provided in said circuit for continuous control of a proportion of the video signal corresponding to a bright portion in the whole picture when a ratio of the bright portion to a dark portion of this object is relatively high.

Reference numeral II designates a limiter circuit adapted to limit a negative side output (i.e., video signal output corresponding to a bright portion in the object) of the video signal inversely amplified by the operational amplifier A1, constituting second means of the present invention. The limiter circuit II is connected in parallel to said variable resistance VR1 and consists of a diode D1, a variable resistance VR2 destined to control electric current flowing through said diode D1, and a switching transistor TR1, in which the inverting input terminal 11 of the operational amplifier A1 is connected to an anode of the diode D1 of which the cathode is, in turn, connected via the variable resistance VR2 to the output terminal 13. For remote-control of the diode D1, there is provided in parallel to said variable resistance VR2 said switching transistor TR1 of which the base is connected via a resistance R4 to a remote terminal 3. This limiter circuit II is arranged, as shown by solid line (2) in FIG. 3, so that the negative side of the output voltage from the operational amplifier A1 has input-/output characteristics forcibly suppressed by the diode D1. Referring to FIG. 3, the abscissa represents an input voltage V11 at the inverting input terminal 11 of the operational amplifier A1 and the ordinate represents the output voltage V13 at the output terminal 13. FIG. 3 indicates that the output voltage V13 is maintained constant at $\beta$ under the effect of the limiter circuit when the input voltage V11 is higher than $\alpha$. Broken line (1) corresponds to the normal characteristics free from any limitation.

The inverted signal Vac obtained by said inverting amplifier I is rectified in a following voltage doubling rectifier. The voltage doubling rectifier consists of a voltage doubling capacitor C2 connected to the output terminal 13 of said operational amplifier A1 and a diode D2 via which the output terminal of said capacitor C2 is connected to the middle point voltage terminal 2. The voltage doubling rectifier further comprises a diode D3 is forwardly connected to the output terminal of said capacitor C2 so that a rectified signal Vdc appears on an output terminal. Reference numeral C3 designates a capacitor provided between the rectifier and the ground side 4.

Reference numeral III designates a stabilizer adapted to stabilize said rectified signal Vdc relative to the source voltage and constituting third means of the present invention. The stabilizer III consists of serial resistances R8, R9 connected between the positive voltage side 5 and the ground side 4, in which an intermediate point between said resistances R8, R9 is connected to the middle point voltage terminal 2 to produce an intermediate voltage VO with respect to the source voltage Vcc on the middle point voltage terminal 2. This embodiment has the optimum arrangement in which both the resistances R8, R9 are identically adjusted so as to produce the voltage VO equal to ½ of the source voltage Vcc on the middle point voltage terminal 2. The stabilizer further comprises a resistance R6, a Zener diode D4 and a resistance R7 connected in this order between the positive voltage side 5 and the ground side 4, on one side, and the output terminal of said voltage doubling rectifer is connected via a resistance R5 between said Zener diode D4 and said resistance R7 so that the rectified signal Vdc may be lowered by a predetermined voltage towards the negative side and thereby both the positive side and the negative side may be covered by the behaviour range of said rectified signal Vdc. In the embodiment, both the resistances R6, R7 are identically adjusted and the Zener voltage Vz is evenly divided on the positive side and the negative side with respect to the middle point voltage VO. Even when the middle point voltage (Vcc/2 in this embodiment) increases as the source voltage Vcc increases, the voltage Vs equal to a half of the Zener voltage Vz remains lowered by a predetermined voltage relative to the middle point voltage VO and thus a voltage difference Vs between the middle point voltage and the rectified signal Vdc is stabilized at a constant value, as will be apparent from FIG. 4.

The rectified signal Vdc level-shifted in the stabilizer III is applied through a resistance 10 to an inverting input terminal 21 of an operational amplifier A2 in a following comparator and there is provided a resistance R11 as a feedback resistance between an output terminal 23 and said inverting input terminal 21 of the operational amplifier A2. A non-inverting input terminal 22 is connected via a resistance R12 to the middle point voltage terminal 2 so that the rectified signal Vdc is compared with the middle point voltage VO and a control signal VOUT is produced on the output terminal 6.

Figure 5:
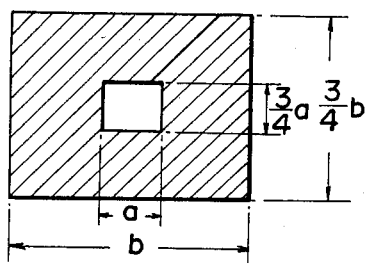
FIG. 5 illustrates a relationship between an object to be picked up and a video signal.
Figure 6:
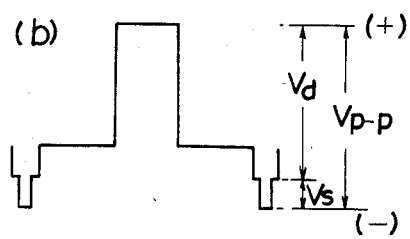
FIG. 6 schematically illustrates an input waveform prior to control by the inventive means.
Figure 6:
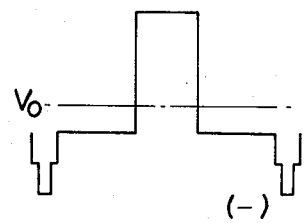
Figure 7:
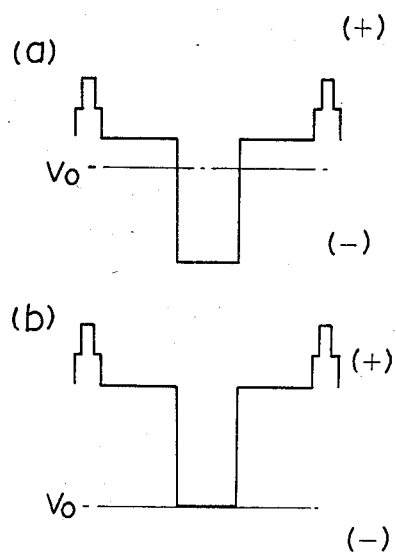
FIGS. 7 and 8 schematically illustrate control signal waveforms obtained by the inventive means.

The embodiment of the present invention of the arrangement as has been described hereinabove functions as follows:

Assumed that a video signal Vin having a waveform as shown by FIG. 5(b) is applied, as illustrated by a test chart of FIG. 5(a) from the television camera to the input terminal 1. In this waveform, a rectangular portion on the positive side corresponds to a bright portion in the picture, Vd and Vs represent a video level and a synchronous level, respectively. This video signal Vin has its DC component clipped by the capacitor C1 and is equalized in the areas on the positive side and the negative side of the reference voltage, as shown by FIG. 6. This signal Vin is inversely amplified by the inverting amplifier I as shown by FIG. 7(a) with respect to the middle point voltage VO supplied from the middle point voltage terminal 2 to produce the corresponding inverted signal Vac on the output terminal 13 of said inverting amplifier I. The gain (amplification degree) of the inverting amplifier I depends on a resistance value ratio of the variable resistance VR1 to the resistance R2. Therefore, the gain increases and the amplitude of the inverted signal Vac also increases when the variable resistance VR1 is regulated to increase its resistance value, while the gain decreases and the amplitude of the inverted signal Vac also is reduced when the variable resistance VR1 is regulated to reduce its resistance value. Also in the case of the optimum video signal from the television camera being too high or too low, a steady output variation can be always obtained by such regulation of the variable resistance VR1. Thus, the first means of the present invention is provided.

Now in the limiter circuit II, the variable resistance VR2 located adjacent to the camera or the remote terminal 3 located remotely from the camera may be regulated to limit the proportion of the video signal corresponding to the bright portion and, depending on a ratio of the bright portion and the dark portion as in the natural world, it may be determined when the bright portion should be selected as a main object to be picked up or the dark portion should be selected as a main object to be picked up. The second means of the present invention can be thus utilized.

When the variable resistance VR2 is regulated to take its resistance value infinite, the inverted signal Vac takes a waveform same as shown by FIG. 7(a), since then the limiter circuit II is not activated. Input of this inverted signal Vac to the capacitor C2 of the voltage doubling rectifier causes a negative portion of the inverted signal Vac to turn the diode D2 on, initiating the capacitor C2 to be charged, and a subsequent positive portion is added to the previously charged voltage. Thus, a voltage doubled signal is DC-regenerated as the DC voltage of the initial amplitude as shown by FIG.

Figure 8:
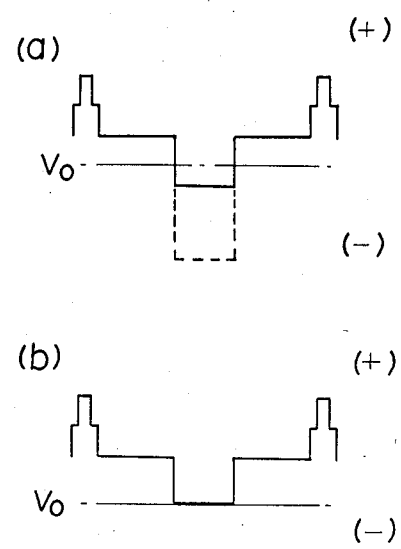

7(b), so the mode of light measuring is set to the one in which the video level Vd of FIG. 5(b) is detected and the bright portion is selected as the main object to be picked up. When the variable resistance VR2 is regulated to take its resistance value O, the diode D1 becomes conductive and the operational amplifier A1 is subjected to limitation as seen in FIG. 3(2), the video signal Vin has its bright portion clipped as shown by FIG. 8(a), producing the inverted signal Vac without a portion as indicated by broken line. This inverted signal Vac may be rectified by the voltage doubling rectifier to achieve DC-regeneration as shown by FIG. 8(b) in the same manner as in the previous case. The rectified signal thus obtained has a value substantially corresponding to an average of the whole amplitude and having the bright portion of the video signal Vin clipped. This means that the control signal has been obtained which is appropriate to select the dark portion as the main object to be picked up. By adjusting said variable resistance VR2 to an intermediate resistance value, an intermediate control signal is obtained correspondingly. Input of the remote voltage to the remote terminal 3 causes the switching transistor TR1 to be turned ON and the diode D1 to become conductive, subjecting the operational amplifier A1 to limitation. Thus, it is possible by utilizing the remote terminal 3 to control whether the bright portion should be selected or the dark portion should be selected as the main object to be picked up.

Figure 4:
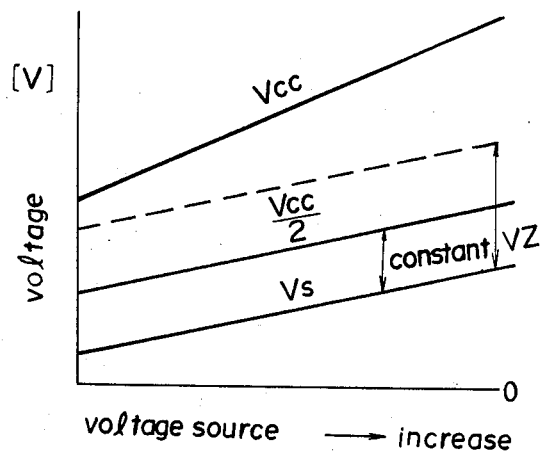
FIG. 4 illustrates a function of the third means provided in said circuit for stabilization of a control signal, which has been obtained by said first and second means and then rectified, with respect to a source voltage.

The rectified signal Vdc which has passed through the voltage doubling rectifier is lowered, as shown by FIG. 4, under the effect of the Zener voltage Vz in the stabilizer III by a predetermined voltage Vs with respect to the middle point voltage VO(Vcc/2). The rectified signal Vdc is on the positive side with respect to the middle point voltage VO even when the object is of the darkest consition, since the video signal Vin originally involves the synchronous level Vs. If such rectified signal is directly compared with the middle point voltage VO to obtain a control signal, no effective control signal could be obtained in response to the dark video signal Vin. To overcome this inconvenience, the present invention provides a unique adjustment such that the rectified signal Vdc is lowered by a predetermined voltage towards the negative side to place the video signal corresponding to the dark portion of the picture on the negative side with respect to the middle point voltage VO. In this way, the rectified signal Vdc can have its same ranges of behaviour both on the positive side and on the negative side with respect to the middle point voltage VO.

This rectified signal Vdc is applied to the inverting input terminal 21 of the operational amplifier A2 and compared with the middle point voltage VO(Vcc/2) obtained in said stabilizer III to produce the control signal Vout on the output terminal 6 of said operational amplifier A2. For the optimum picture, the rectified signal Vdc(V21) is equal to the middle point voltage VO and the output voltage V23 is equal to VO. Accordingly, no diaphragm control occurs, since the control signal Vout is O. For a relatively bright object to be picked up, i.e., when the input voltage V21 is higher than VO, the output voltage V23 is lower than VO and, therefore, the control signal Vout is a negative diaphragm control signal functioning to close the diaphragm. For a relatively dark object to be picked up, i.e., when the input voltage Vdc(V21) is lower than VO, the output voltage V23 is higher than the middle point voltage VO and, therefore, the control signal Vout is a positive diaphragm control signal functioning to open the diaphragm.

As will be obvious from the aforegoing description, the automatic diaphragm control device for use with CCTV camera according to the present invention permits the video signal applied from the television camera to be continuously controlled to obtain the diaphragm control signal providing the optimum picture, even when said video signal is not uniform due to the absolute brightness of an object to be picked up or due to the type of the television camera being used. The present invention permits also, depending on a ratio of bright portion and dark portion in the object (i.e., contrast), a proportion of the video signal corresponding to the bright portion to be limited, thereby providing a desired diaphragm control signal for the optimum picture selectively containing the bright portion or the dark portion as the main object to be picked up. Finally, the diaphragm control signal is stabilized with respect to the voltage equal to a half of the source voltage, in accordance with the present invention, and thereby it is possible to achieve the diaphragm control within a range of voltage as wide as has not been expected in the conventional stabilizer.

What is claimed is

1. An automatic diaphragm control device for use with a CCTV camera in which a video signal applied from the CCTV camera is utilized for diaphragm control, said automatic diaphragm control device comprising:

first means for continuous control of the video signal with respect to an absolute brightness of an object to be picked up;

second means for continuous control of a proportion of the video signal corresponding to a bright portion in the whole picture when a ratio of the bright portion to a dark portion of this object is relatively high; and third means for stabilization of a control signal, which has been obtained by said first and second means and then rectified, with respect to a source voltage.

2. An automatic diaphragm control device for use with a CCTV camera in which a video signal applied from the CCTV camera is utilized for diaphragm control, said automatic diaphragm control device comprising:

first means consisting of an inverting amplifier adapted for inverse amplification of the video signal applied from the CCTV camera with a variable degree of amplification and for continuous control of the video signal with respect to an absolute brightness of an object to be picked up;

second means consisting of a limiter circuit connected to said inverting amplifier for continuous limitation of the video signal inversely amplified by said inverting amplifier and characterizing the bright portion in the whole picture;

a voltage doubling rectifier adapted for rectification of the inverted signal obtained by said inverting amplifier and said limiter circuit;

third means adapted to stabilize the rectified signal obtained in said voltage doubling rectifier at a level lowered by a predetermined voltage with respect to a middle point voltage intermediate the source voltage; and a comparator adapted to compare the rectified signal thus stabilized with said middle point voltage to produce a diaphragm control signal.

3. A device according to claim 2, wherein the inverting amplifier as the first means is so arranged to provide a low gain when the optimum video signal of the television camera is at a high level and to provide a high gain when the optimum video signal of the television camera is at a low level in order to maintain input/output characteristic uniform.

4. A device according to claim 2, wherein the second means comprises a switching transistor adapted to be continuously controlled at will adjacently to or remotely from the camera objective itself.

5. A device according to claim 2, wherein the third means is so arranged to stabilize the control signal at a level lowered by a predetermined voltage with the middle point voltage equal to a half of the source voltage and thereby to maintain the diaphragm value once adjusted under a given source voltage constant.

* * * * *